UNITED STATES PATENT OFFICE 2,477,550

SEPARATION OF THE COMPONENTS OF POLYGLYCEROL MIXTURES

Harold Wittcoff, Minneapolis, Minn., assignor to General Mills, Inc., a corporation of Delaware No Drawing. Application June 17, 1946, Serial No. 677,423

7 Claims. (Cl. 260—338)

The present invention relates to the separation of polyglycerol mixtures into their components and relates to the novel compounds produced during the separation.

Polyglycerol, as ordinarily prepared, is composed of a mixture of unreacted glycerol, diglycerol, triglycerol, and possibly some higher polymers. Frequently these polyglycerol mixtures are used as such, but the pure isolated compounds are useful for particular purposes such as the synthesis of definite compounds. It is, therefore, advantageous to be able to separate polyglycerol into its components.

Various attempts in this direction have been made, but these have not been entirely satisfactory. Distillation of the polyglycerol mixture itself is difficult because of the high boiling points of the components. Thus diglycerol boils at 200–225° C. at 1 to 2 mm. Moreover during this high temperature distillation, further polymerization is likely to occur.

The present invention circumvents all these difficulties by providing low boiling easily distillable derivatives which may be hydrolyzed with ease to yield the parent compounds which are readily recoverable. The invention involves the conversion of polyglycerol mixtures into mixtures of acetals which are low boiling and which have widely separated boiling points. These acetals can be fractionated and hydrolyzed to the glycerol compounds and readily recovered.

It is therefore an object of the present invention to provide a novel process of fractionating a polyglycerol mixture into its components.

It is a further object of the invention to provide a process of fractionating a polyglycerol mixture into its components by the formation of acetals, the fractional distillation of these acetals, and the reconversion of these acetals into their respective polyglycerols.

It is a further object of the present invention to provide novel acetal products.

These and further objects of the invention will be more fully apparent from the following description thereof, with particular reference to the examples, which are to be considered as illustrative only and not as limiting the invention.

The invention is applicable to polyglycerol mixtures in general, regardless of the particular process by which the polyglycerol mixture is prepared. One method of preparation involves the heating of the glycerol at 200–300° C. with a small amount of a basic material such as sodium hydroxide, potassium hydroxide, thorium oxide, magnesium oxide, alkali metal acetates, carbonates, and the like.

The polyglycerol mixture, such as described above, is treated with a lower aliphatic ketone or aldehyde in the presence of a suitable catalyst such that acetal formation results. The term "acetal" as used herein includes derivatives formed from any carbonyl-containing compound, whether it be an aldehyde or ketone; for example, formaldehyde, acetaldehyde, propionaldehyde, acetone, methyl ethyl ketone, diethyl ketone, and the like may be used for this purpose. A suitable catalyst such as strong mineral acids, for example, hydrochloric or sulfuric acid in dilute concentration, p-toluenesulfonic acid, phosphorus pentoxide, copper sulfate, calcium chloride, ferric chloride, ammonium chloride, potassium bisulfate, ammonium nitrate, zinc chloride, and the like may be used. If desired, a dehydrating agent such as sodium sulfate, may be used in the reaction mixture to remove any water formed, or the water may be removed azeotropically by means of a low boiling azeotrope such as that formed with low boiling petroleum ether. In some instances, the water may be simply distilled from the mixture.

In the preferred embodiment of the invention, acetone is used to yield the isopropylidene derivatives of the various components of the polyglycerol mixture. It is preferred because of its low price, ready availability, and the ease with which it forms acetals.

After the acetal mixture has been formed, it is subjected to fractional distillation, preferably in a vacuum. The first fraction taken off ordinarily is composed of a low boiling isopropylidene derivative of glycerol. An intermediate boiling fraction is composed of a di-isopropylidene derivative of diglycerol, which is herein referred to as di-isopropylidenediglycerol. A higher boiling fraction is composed principally of the di-isopropylidene derivative of triglycerol, with minor amounts of isopropylidene derivatives of higher polyglycerols.

In some cases there is a tendency for the formation of monoisopropylidene derivatives of compounds which are capable of forming di-isopropylidene derivatives. For example, in addition to the di-isopropylidenediglycerol which is formed, some monoisopropylidenediglycerol may form. This latter material is considerably higher boiling than the diacetal. Thus during the distillation it distills with the next higher fraction— i. e., with the di-isopropylidene derivative of triglycerol, serving to contaminate this latter material. This difficulty may be avoided by subjecting the entire mixture to distillation until all of the isopropylideneglycerol and the di-isopropylidenediglycerol has been removed. Thereafter the residue may be subjected once more to acetalization according to any of the procedures mentioned above. Thereupon the product of the reacetalization is subjected to vacuum distillation to obtain more di-isopropylidenediglycerol which was formed in the reacetalization from the monoisopropylidenediglycerol present. Thereafter the third portion is obtained which consists chiefly of the di-isopropylidene derivative of triglycerol together with minute amounts of the isopropylidene derivatives of higher polyglycerols.

The individual acetal fractions may be hydrolyzed simply by heating an aqueous mixture of the acetal with a small amount of concentrated acid, such as hydrochloric acid for a few minutes on a steam bath. The water and acetone may then be removed to leave as a residue, a substantially pure product which, if desired, may be subsequently distilled. The amount of the individual polyglycerols obtained is roughly quantitative.

Example 1

To 300 g. of polyglycerol with a hydroxyl content of 41.3% was added 1500 cc. of acetone into which had been bubbled 24 g. of gaseous hydrogen chloride. Thereafter, 300 g. of anhydrous sodium sulfate was added. The mixture was shaken mechanically for twenty-four hours, complete solution occurring after a short time. After completion of shaking, the reaction mixture was filtered and made alkaline with alcoholic sodium hydroxide. The precipitated sodium chloride was removed by filtration, whereupon the acetone was removed by distillation. There remained 310 g. of product which on distillation in an alembic type of apparatus yielded 294 g. of product which distilled at 40–200° C. at 5 mm. This distilled material was fractionated through an 18-inch Vigreux column to obtain 266.5 g. of distillate of which 140 g. (52.5%) was isopropylideneglycerol, 60 g. (22.6%) was di-isopropylidenediglycerol, and 66.5 g. (24.9%) was a mixture of acetonation products of polyglycerols higher than diglycerol.

Pure isopropylideneglycerol distilled at 64–66° C. at 1 mm. and possessed a refractive index of 1.4322 at 25° C. Pure di-isopropylidenediglycerol distilled at 97–98° C. at 1 mm. and had a refractive index of 1.4375 at 25° C. and a density of 1.061 at 25° C.

A solution of 71 parts of di-isopropylidenediglycerol in 75 parts of water was heated with 5 parts of concentrated hydrochloric acid on the steam bath for five minutes. Thereafter, the water and other volatile material was removed in vacuo to obtain a theoretical quantity (48 parts) of almost pure diglycerol. This was further purified by distillation to obtain a product which distilled at 208° C. at 1 mm. and which had a refractive index at 25° C. of 1.4375.

Example 2

Three hundred grams of a polyglycerol with a hydroxyl content of about 41% was stirred overnight with 1500 cc. of acetone into which had been bubbled 15 g. of anhydrous hydrogen chloride, and with 300 g. of sodium sulfate. The reaction mixture was worked up as described in the preceding example, after which the mixture was distilled through an 18-inch Vigreux column. There was obtained a low-boiling portion (47–53° C. at 0.5 mm.) which weighed 102.7 g. and was isopropylideneglycerol. Thereafter a fraction weighing 39.2 g. was obtained which distilled at 84–100° C. at 0.5 mm., and which was chiefly di-isopropylidenediglycerol.

There remained 141 g. of residue which was not distilled further but which was treated with 100 cc. of acetone into which had been bubbled 7.0 g. of anhydrous hydrogen chloride, and with 150 g. of sodium sulfate. The mixture was allowed to stir overnight to effect complete acetonation of any monoisopropylidenediglycerol or monoisopropylidenetriglycerol present. The acetonation mixture was worked up as indicated previously and the product was distilled through an 18-inch Vigreux column to obtain 72.4 g. more of di-isopropylidenediglycerol. Thus a total of 111.6 g. of di-isopropylidenediglycerol was obtained. The column was then removed, and the remainder of the material was distilled at 161–195° C. at 4.0 mm. to obtain 82.3 g. of product which consisted chiefly of the di-isopropylidene derivative of triglycerol.

A solution of 63 g. of the material described herein which was chiefly di-isopropylidenetriglycerol in 50 cc. of H₂O was treated with 5 cc. of concentrated hydrochloric acid. The mixture was heated on the steam bath for five minutes after which the volatile material was removed at reduced pressure. The residue was distilled in vacuo at 170–200° C. at 0.3 mm. to obtain a product which had a hydroxyl content of 34.1%. Pure triglycerol has a hydroxyl content of 35.4%.

Example 3

A 3-necked flask was equipped with a stirrer, an 18-inch silvered helices packed, total reflux column which in turn was fitted with a water trap and a condenser. The flask was charged with 100 parts of polyglycerol with a hydroxyl content of 38.4%, 350 parts of acetone, 350 parts of Skellysolve F, and 3 parts of p-toluenesulfonic acid. The mixture was refluxed and stirred for forty-eight hours at the end of which time 27 parts of aqueous material had collected in the water trap. The volatile material was then removed by distillation after which there remained 128.8 parts of material which on distillation through an 18-inch Vigreux column yielded 31.3 parts of isopropylideneglycerol, 31.6 parts of di-isopropylidenediglycerol, and 25.8 parts of a mixture of acetonation products of higher polyglycerols.

It will be apparent from the foregoing description that the present invention provides a simple and economical process of fractionating a polyglycerol mixture into its components. It also provides novel acetal products which are useful intermediates in the preparation of pure polyglycerol compounds as well as intermediates for further synthesis.

While various embodiments of the invention have been discussed, it is to be understood that the invention is not limited thereto, but may be varied within the scope of the following claims.

I claim as my invention:

1. Process for the fractionation of a mixture of polyglycerols which comprises reacting the polyglycerols with an aliphatic carbonyl-containing compound containing not more than 5 carbon atoms in the presence of an acidic catalyst to convert the polyglycerols to acetals and subjecting the mixture of acetals to fractional distillation, and hydrolyzing the fractionated acetals to the polyglycerols.

2. Process for the production of substantially pure diglycerol from a mixture of polyglycerols containing diglycerol which comprises reacting the mixture with an aliphatic carbonyl-containing compound containing not more than 5 carbon atoms in the presence of an acidic catalyst to convert the mixture to acetals, fractionally distilling the acetals, recovering a substantially pure fraction containing the acetal of diglycerol, and hydrolyzing the fraction to diglycerol.

3. Process for the production of substantially pure triglycerol from a mixture of polyglycerols containing triglycerol which comprises reacting the mixture with an aliphatic carbonyl-containing compound containing not more than 5 carbon atoms in the presence of an acidic catalyst to convert the mixture to acetals, fractionally distilling the acetals, recovering a substantially pure fraction containing the acetal of triglycerol, and hydrolyzing the fraction to triglycerol.

4. Process for the fractionation of a mixture of polyglycerols which comprises reacting the mixture with an acetone in the presence of an acidic catalyst to form the acetal of the polyglycerols, fractionally distilling the acetals and hydrolyzing the fractionated acetals to the corresponding polyglycerol.

5. An acetal of a polyglycerol, the acetal-forming group containing an aliphatic group of not more than 5 carbon atoms.

6. Di-isopropylidenediglycerol.

7. Di-isopropylidenetriglycerol.

HAROLD WITTCOFF.

REFERENCES CITED

The following references are of record in the file of this patent:

UNITED STATES PATENTS

| Number | Name | Date |
|---|---|---|
| Re. 13,234 | Fleming | May 9, 1911 |
| 1,934,309 | Hoover | Nov. 7, 1933 |
| 2,223,421 | Hubacher et al. | Dec. 3, 1940 |
| 2,258,892 | Harris | Oct. 14, 1941 |
| 2,260,261 | Morey | Oct. 21, 1941 |
| 2,382,764 | Young et al. | Aug. 14, 1945 |